Sept. 28, 1954      P. BREM      2,690,232

STRAINER-INSERT AND TRAP

Filed Feb. 9, 1953

INVENTOR
PAUL BREM,
BY *James M. Drysdale*
ATTORNEY

Patented Sept. 28, 1954

2,690,232

UNITED STATES PATENT OFFICE 2,690,232

STRAINER-INSERT AND TRAP

Paul Brem, Portland, Maine

Application February 9, 1953, Serial No. 335,769

3 Claims. (Cl. 182—23)

This invention relates to a sink trap and strainer insert therefor, and one of the principal objects is to provide a strainer insert for a sink trap which can be quickly inserted in or removed from the sink trap by hand without the use of a wrench or other tool and by an unskilled person.

Another object of the invention is to provide a strainer insert for a sink trap comprising a plug or stopper provided with a rubber gasket, said strainer insert being fitted within a short section of pipe comprising the lower portion of the sink trap which extends at an obtuse angle to the main body portion of the sink trap, said plug being held in place by means of a wire bail or yoke hinged to a collar attached to and surrounding a convenient portion of the sink trap.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in the various figures of the drawing.

Figure 1:
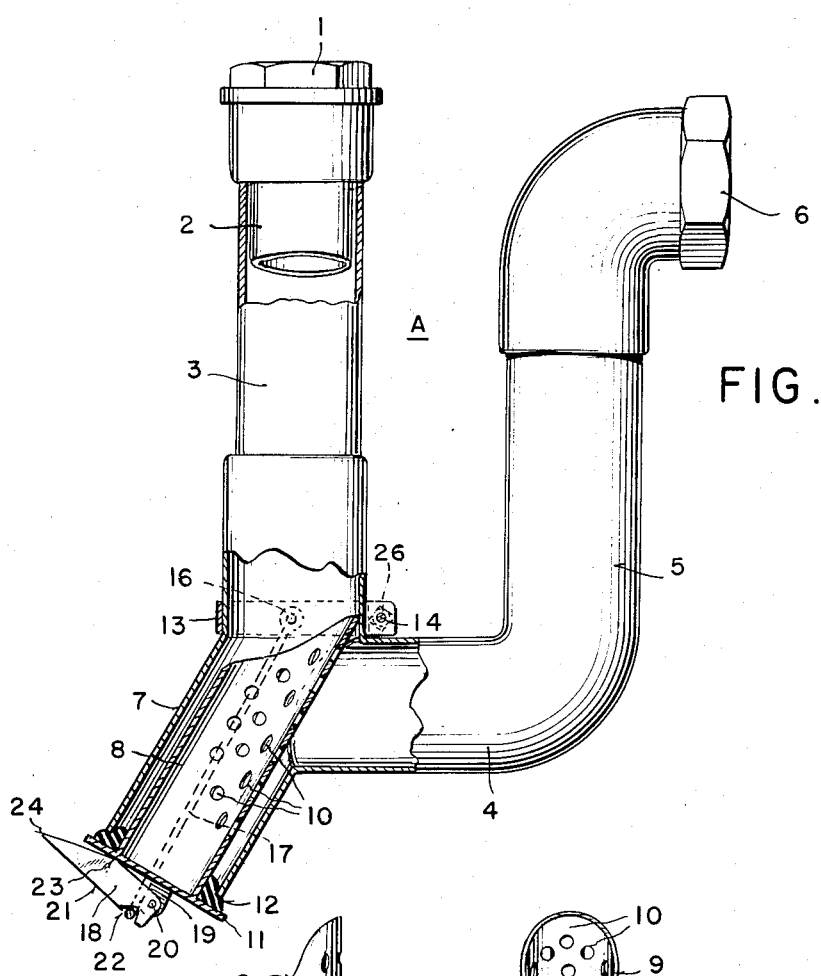
Fig. 1 is a side elevation of a sink trap having fitted thereto a strainer insert, the lower portion of the trap and the strainer insert mounted therein being shown in section.
Figure 2:
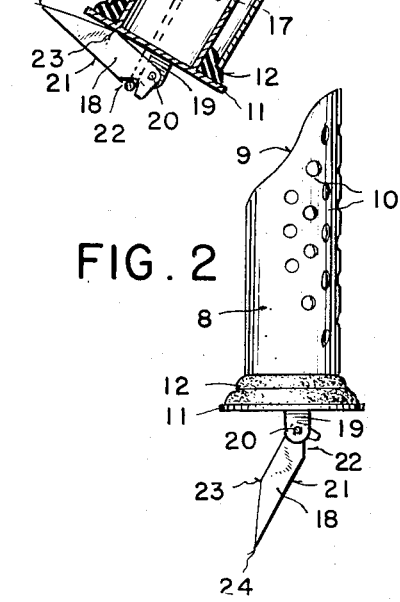
Fig. 2 is a side elevation of the strainer insert.
Figure 3:
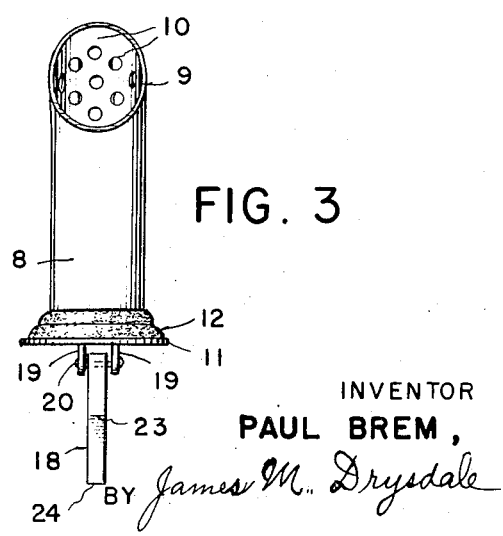
Fig. 3 is a front elevation of the strainer insert.

Referring to the drawings, the letter A designates a sink trap adapted for attachment beneath a sink by coupling means 1 and provided with a downwardly extending vertical portion 3 having a customary form of tail piece 2 mounted therein, a lower horizontal portion 4 and an upwardly extending portion 5 which is adapted for connection with a waste pipe by means of a coupling 6. Projecting downwardly from the vertical portion 3 and at an obtuse angle thereto is a tubular open ended trap portion 7 within which is mounted a cylindrically shaped strainer insert 8 having an elongated taper at its upper open end forming an oblique bevel of substantially greater length than the tube diameter and having on one side a series or group of small openings or perforations 10 which permit the water to flow through the trap to the waste pipe and collect any solid matter carried by the water in said strainer insert.

The plug or base 11 of the strainer is provided with a heavy-duty rubber gasket 12 which will form a water tight protection between the plug and trap when the strainer insert is firmly in place.

At the lower end of the vertical portion 3 is mounted a collar 13 which is clamped rigidly in place by means of the bolt 14 and nut 26.

On the outside of the collar 13 and diametrically opposite each other are welded or soldered two short, hollow posts or bearings 16 into which are swivelled the terminals of a U-shaped spring bar 17 which is adapted to swing back and forth over the plug or base 11 and engage a notched pivot catch 18 which assists in holding the strainer insert in the base of the trap. When the entire strainer insert is securely in place the spring bar will fit snugly into the notch in the pivot catch.

As will be observed in Fig. 1, the pivot catch 18 is pivoted at one end by means of a pivot pin 20 to a lug 19 projecting from the bottom of the base 11 at a point slightly to one side of the center of the base. The lower straight side 21 of the pivot catch 18 is provided, near one end below the pivot pin 20, with a notch 22 adapted to engage the lower end of the spring bar 17. The upper side of the pivot catch 18 tapers off from a point 23 near its center to the end 24 of the pivot catch.

To place the strainer insert into operative position, the strainer insert is inserted upwardly into the tubular portion or trap T through the trap opening. The pivot catch, when not in operative position, dangles freely in a vertical position but when the spring bar 17 is caused to enter the notch 22 and the pivot catch 18 pushed into approximately a horizontal position so that the point 23 engages the base 11 of the strainer, the strainer is locked in operative position.

To release and remove the strainer insert it is only necessary to press down on the pivot-catch to release the spring bar. The strainer insert will then slip downward from the trap and any solid matter which has been washed from the sink into the tail piece and then into the strainer insert can readily be removed.

Water, with any foreign matter therein will wash downward into the perforated strainer insert. Any matter other than water must remain contained within the strainer-insert, as the latter is perforated only for the purpose of permitting the water to escape into the waste pipe and then into the soil pipe.

Any heavier than water foreign matter will drop to the bottom of the perforated strainer-insert which, when necessary, can be removed by pushing downward on the pivot-catch 18 to release the spring bar 17, The drawings show the preferred form of strainer-insert consisting of a perforated cylindrical member but it is obvious that such an insert might be replaced by one made of gauze, woven wire, or other foraminous material.

The use of all these materials is well known in the art.

The heavy duty rubber gasket 12 serves admirably to form a water-tight connection between the plug or base 11 and the trap 7.

From the foregoingn description, it is thought to be obvious that a strainer-insert and trap constructed in accordance with my invention is particularly well adapted for use by reason of the convenience and facility with which it may be assembled and operated and it will be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A strainer-insert and trap for sinks comprising a downwardly extending vertical portion, coupling means for attaching said portion beneath a sink, an upwardly extending portion which is adapted to connect with a waste pipe, a horizontal portion connecting the downwardly extending and the upwardly extending portions at their lower ends, a tubular open ended trap portion projecting downwardly from the vertical portion at an obtuse angle thereto, a cylindrically shaped strainer insert having a plug or base and mounted within the trap portion, means for removably securing said strainer in said trap portion, said strainer insert having an elongated taper at its upper open end, forming an oblique bevel of substantially greater length than the tube diameter and having on one side a series of small openings opposite the bevelled portion whereby water entering into said strainer insert is allowed to escape through the perforations of the insert and any solid matter carried by the water is collected in the strainer insert, a heavy duty rubber gasket mounted on said base and forming a water tight protection between the base and trap when the strainer insert is firmly in place.

2. A strainer-insert and trap for sinks comprising a downwardly extending vertical portion adapted to receive a tail piece, coupling means for attaching said portion beneath a sink, an upwardly extending portion which is adapted to connect with a waste pipe, a horizontal portion connecting the downwardly extending and upwardly extending portions at their lower ends, a tubular, open ended trap portion projecting downwardly from the vertical portion at an obtuse angle thereto, a cylindrically shaped strainer-insert mounted within the trap portion, said strainer insert having an elongated taper at its upper open end, forming an oblique bevel of substantially greater length than the tube diameter and having on one side a series of small openings opposite the bevelled portion whereby water entering into said strainer insert is allowed to escape through the perforations of the insert and any solid matter carried by the water is collected in the strainer insert, a plug or base attached to the lower end of said insert, a heavy duty rubber gasket mounted in said base, a notched pivot catch pivoted beneath said base, a collar clamped to the lower end of the vertical portion, a U-shaped spring bar pivoted at its ends to said collar, and adapted to swing downwardly to engage the notch in the pivot catch thereby locking the strainer-insert in operative position when the pivot catch is pushed into approximately a horizontal position.

3. In a strainer insert and trap, a vertical portion, a tubular open ended trap portion projecting downwardly from the vertical portion at an obtuse angle thereto, a cylindrically shaped strainer insert mounted within the trap portion, means for removably securing said strainer insert in said trap, said strainer insert having an elongated taper at its upper open end, forming an oblique bevel of substantially greater length than the tube diameter and having on one side a series of small openings opposite the bevelled portion whereby water entering into said strainer insert is allowed to escape through the perforations of the insert and any solid matter carried by the water is collected in the strainer insert.

References Cited in the file of this patent

UNITED STATES PATENTS

| Number | Name | Date |
|---|---|---|
| 1,123,705 | Dehn | Jan. 5, 1915 |
| 1,192,265 | Bird | July 25, 1916 |
| 1,194,091 | Stenquist | Aug. 8, 1916 |
| 1,634,530 | Anderson | July 5, 1927 |
| 2,043,412 | Klein | June 9, 1936 |

FOREIGN PATENTS

| Number | Country | Date |
|---|---|---|
| 6,055 | Great Britain | Mar. 10, 1911 |